United States Patent [19]

Takeuchi

[11] Patent Number: 4,639,682
[45] Date of Patent: Jan. 27, 1987

[54] CARRIER REPRODUCING CIRCUIT FOR PHASE SHIFT KEYING SIGNALS

[75] Inventor: Seiji Takeuchi, Fukaya, Japan

[73] Assignee: Kabushiki Kaisha Toshiba, Kawasaki, Japan

[21] Appl. No.: 751,236

[22] Filed: Jul. 2, 1985

[30] Foreign Application Priority Data

Jul. 10, 1984 [JP] Japan .................. 59-141472

[51] Int. Cl.⁴ .................................. H03D 3/02
[52] U.S. Cl. ...................... 329/50; 329/122; 329/126; 375/81; 455/208
[58] Field of Search ............... 329/50, 110, 122, 126, 329/168; 375/81, 82, 97, 100; 455/208, 323

[56] References Cited

U.S. PATENT DOCUMENTS

4,330,861 5/1982 Impallomeni et al. .......... 375/86 X
4,525,676 6/1985 Atobe et al. .................... 329/110 X

Primary Examiner—Eugene R. Laroche
Assistant Examiner—Robert J. Pascal
Attorney, Agent, or Firm—Cushman, Darby and Cushman

[57] ABSTRACT

A frequency converter converts the frequency of a PSK signal into a frequency of a carrier to be reproduced. A carrier reproducing circuit including a PLL circuit reproduces the carrier. The intended data contained in the reproduced carrier is demodulated. A frequency correction data generator forms correction data according to a bit error rate of the demodulated data, and superposes the correction data on a control voltage to a voltage controlled oscillator of the PLL circuit.

5 Claims, 5 Drawing Figures

CARRIER REPRODUCING CIRCUIT FOR PHASE SHIFT KEYING SIGNALS

BACKGROUND OF THE INVENTION

This invention relates to a carrier reproducing circuit for Phase shift keying signals for reproducing a carrier which is a part of the Phase shift keying signal.

In the present civilized world, there have been strong demands for quick, various, high quality information services. To meet such demands, industry has made remarkable advances in communication technology, particularly related to information services, data, picture, sound, etc. Typical examples of the implementation of state of the art communication technology include multichannel sound broadcasting, teletext, facsimile, still picture broadcasting, high quality TV, satellite broadcasting, etc. To effectively utilize transmission lines, it is a common practice to employ digital coding transmission for multichannel transmission.

In the satellite broadcasting system, for example, a GHz band signal is radiated from a ground station, and a satellite repeats the signal toward a number of earthbound receiving stations. In this broadcasting system, a channel group consisting of one hundred and several tens channels is used for television signal transmission. Each channel has a 6 MHz frequency band.

For transmitting a sound signal by using the channel group system, the 6 MHz frequency band is divided into five narrow frequency bands, 1st to 5th channels, which are respectively assigned for different sound services. One of the sound signal transmission systems of this type is a phase shift keying (PSK) modulation system. In this PSK modulation system, the phase of a carrier signal is modulated by a binary code signal. A reference phase is set up in the carrier signal. Phases shifted from the reference phase are assigned to binary codes. In the receiving side, a carrier contained in the incoming RF signal is reproduced using the baseband signal. Then, the reproduced carrier is appropriately processed to demodulate the original sound signal.

Since the PSK modulation system has a good frequency utilizing efficiency, the C/N ratio, i.e., subcarrier power to noise ratio, can be large. Particularly, the 4-phase PSK modulation system is excellent in the frequency utilizing efficiency, and easy in bit error correction.

Specifically, in the 4-phase PSK modulation system, the phase of the carrier is shifted to 4 phases, 0°, 90°, 180°, and 270° according to a sound signal. These are subjected to the logical sum operation. Then, the sound data is gray coded. The gray binary code system is featured in that bit error correction is easy because in the gray binary code representation only one bit differs between the adjacent bits, that is a data to data distance becomes 1.

At the receiver, a baseband signal is selected by a phased locked loop (PLL) circuit including a voltage controlled oscillator (VCO), to select a desired channel group. Further, one sound channel is selected from the selected channel group, to effect the 4-phase demodulation of the sound signal. To demodulate the 4-phase PSK signal for sound data transmission, after the carrier is reproduced for phase discrimination, data is demodulated. In this case, the carrier must exactly be reproduced; otherwise bit errors occurs in the reproduced signal, resulting in incorrect data reproduction. To establish the best of the 4-phase PSK modulation system featured by high C/N ratio and easy bit error correction, frequency variation must be minimized during the process of the frequency conversion for carrier reproduction. To reduce the bit error in the reproduced data, a VCO with little frequency variation must be used for that of the carrier reproducing circuit of the 4-phase PSK demodulator.

The frequency variation of the frequency converting means for obtaining the baseband signal and an improper or narrow pull-in frequency range of the VCO would cause the bit error in the reproduced signal. In the case of sound data, so bit error appears in the form called click noise.

When the 4-phase PSK signal is synchronously detected for data demodulation, an error rate Pe of data is given by an equation (2), using the Gaussian distribution function expressed by an equation (1), on the assumption that Gaussian noise of a variance $\alpha^2$ is superimposed on the synchronous detected output signal.

$$\phi(z) = 1/\sqrt{\pi 2} \, _\alpha^z \exp[-t^2/2]dt \ldots \quad (1)$$

$$Pe = 2[1 - \phi(\sqrt{C/N})] \ldots \quad (2)$$

As seen from the equation (2), as the C/N ratio is larger, the bit error rate becomes smaller. To increase the C/N ratio, the pull-in range of the VCO for carrier reproduction need only be widened.

As described above, to reduce the bit error rate, it is necessary to minimize frequency variation during the frequency conversion for baseband signal discrimination and to set up a proper pull-in range of the VCO for carrier reproduction.

SUMMARY OF THE INVENTION

Accordingly, an object of the present invention is to provide a carrier reproducing circuit for PSK signals which can exactly reproduce an incoming carrier signal in frequency and phase.

According to the present invention, there is provided a carrier reproducing circuit for PSK signals. In the carrier reproducing circuit, an incoming RF signal is frequency converted into a signal with a frequency of a carrier to be reproduced. The signal with such a frequency is applied to a carrier reproducing circuit with a phase locked loop. The carrier is reproduced under control of a voltage controlled oscillator in the phase locked loop. The correction data is formed based on the detection of a bit error rate of the demodulated data derived from a data processing circuit. The correction data is added to the output voltage of a phase comparator in the phase locked loop. The voltage controlled oscillator is controlled by the result of the addition.

With such an arrangement, the pull-in frequency range of the voltage controlled oscillator for carrier reproduction is wide, and the frequency of the reproduced carrier is extremely stable.

DETAILED DESCRIPTION OF THE PREFERRED EMBODIMENT

A preferred embodiment of the present invention will be described in detail referring to the accompanying drawings.

There has been used a data communication system based on a PSK (phase shift keying) modulation system as a specific type of the phase modulation system. In this communication system, one phase of a carrier is used as a reference phase. The phase of the carrier is shifted from the reference phase into several phases. These shifted phases of the carrier are assigned to binary codes representative of data. The transmitting side transmits the data signal represented by the binary codes of the shifted phases. The receiver side receives the data signal, first reproduces the carrier, and then demodulates the original data. This PSK system has a good C/N ratio. One type of PSK modulation system is the 4-phase PSK modulation system. The PSK modulation system can utilize two, four and eight phase shifts or changes. The 4-phase PSK modulation system has a higher transfer efficiency of data than the 2-phase PSK system. Further, this modulation system is superior to the 8-phase PSK modulation system in that the modulation and demodulation circuits are simple, and bit error correction is easy.

In a 4-phase PSK modulation system for sound transmission, the sound signal is converted into a digital signal with a bit rate of 2.04 Mbit/s. The digital signal modulates the subcarrier of 5.73 MHz in the 4-phase PSK manner. The phase of the subcarrier of 5.73 MHz is shifted into 4 phases. These four phases are quantized with the quantizing steps of 14 bits, and semicompanded, and encoded into a gray code of 10 bits length. The semicompand reduces the bit error which would occur at the reception of the signal having a low C/N ratio. A BCH (Bose-Chaudhuri) code for checking bit error is attached to the code thus obtained and representing the sound data. The semicompanding and the Bose-Chaudhuri-Hocquengham (BCH) code are used as the measure for bit error which would occur upon reception of a low C/N signal. The coded signal is transmitted to the receiving side in an interleaved manner, in order to comply with the error burst problem, which would occur on the transmission line.

The receiver side picks up a desired data signal, frequency converts it to have a predetermined frequency according to the picked up signal. Then, it is subjected to various processings, PSK demodulation for reproducing the 6.6 MHz subcarrier, deinterleaving, gray code conversion, logical subtraction, parallel to serial (P/S) conversion, etc.

Figure 1:
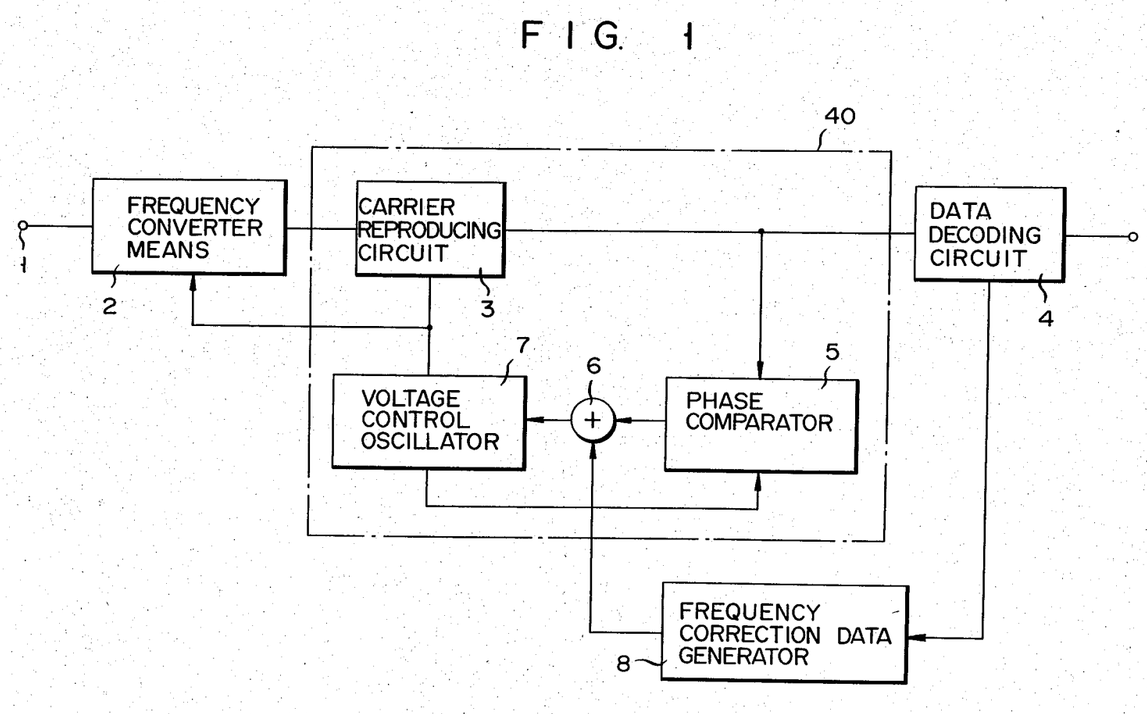
FIG. 1 shows a block diagram illustrating a scheme of a carrier reproducing circuit embodying the present invention.

FIG. 1 shows in block form an embodiment of a carrier reproducing circuit for PSK signals according to the present invention. A signal enters an input terminal 1 and is coupled to a frequency converter 2. The frequency converter 2 converts the frequency of the input signal into a predetermined frequency. The frequency converted signal is input to a carrier reproducing circuit 3. The output signal of the carrier reproducing circuit 3 is applied to a data decoding circuit 4 and a phase comparator 5. The output signal from the phase comparator 5 is applied through an adder 6 to a voltage controlled oscillator (VCO) 7. Then, the VCO 7 phase controls its output signal. The phase controlled output signal of the VCO 7 is applied to the frequency converter 2 and the carrier reproducing circuit 3. Upon detection of a bit error rate of the decoded data from the data decoding circuit 4, a frequency correction data generator 8 generates correction data for the detected bit error, and applied to an adder 6. The adder 6 adds together the correction data and the output data from the phase comparator 5, and the result of the addition is applied to the VCO 7. The decoded data is derived from the data decoding circuit 4.

Figure 2A:
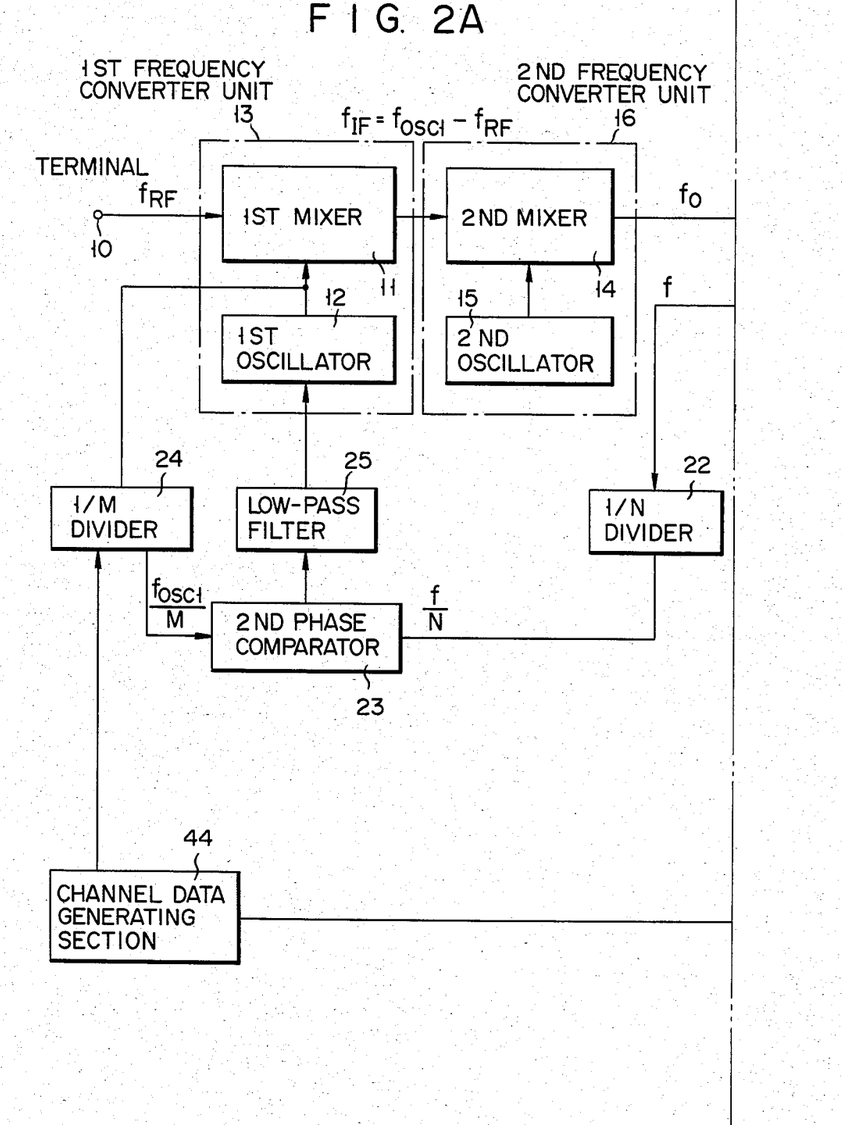
FIGS. 2A, 2B and 2C are more detailed block diagrams of the carrier reproducing circuit of FIG. 1.
Figure 2B:
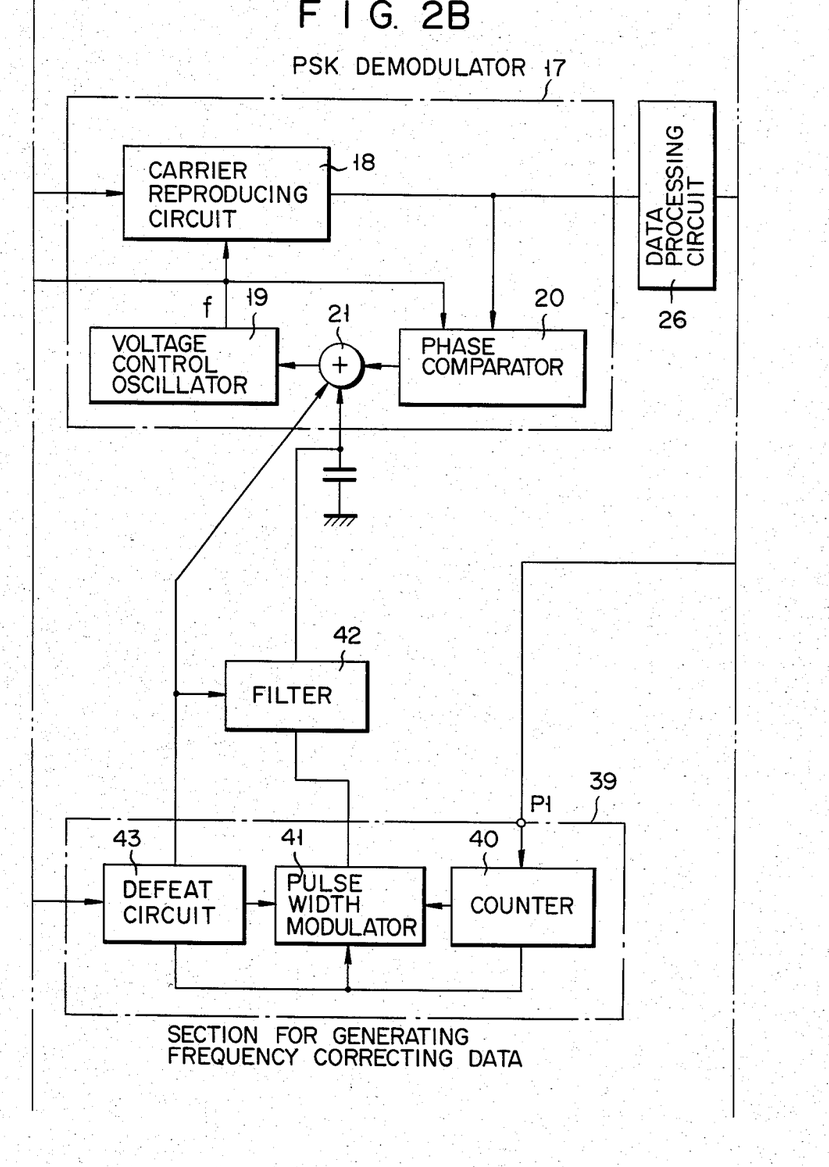
Figure 2C:
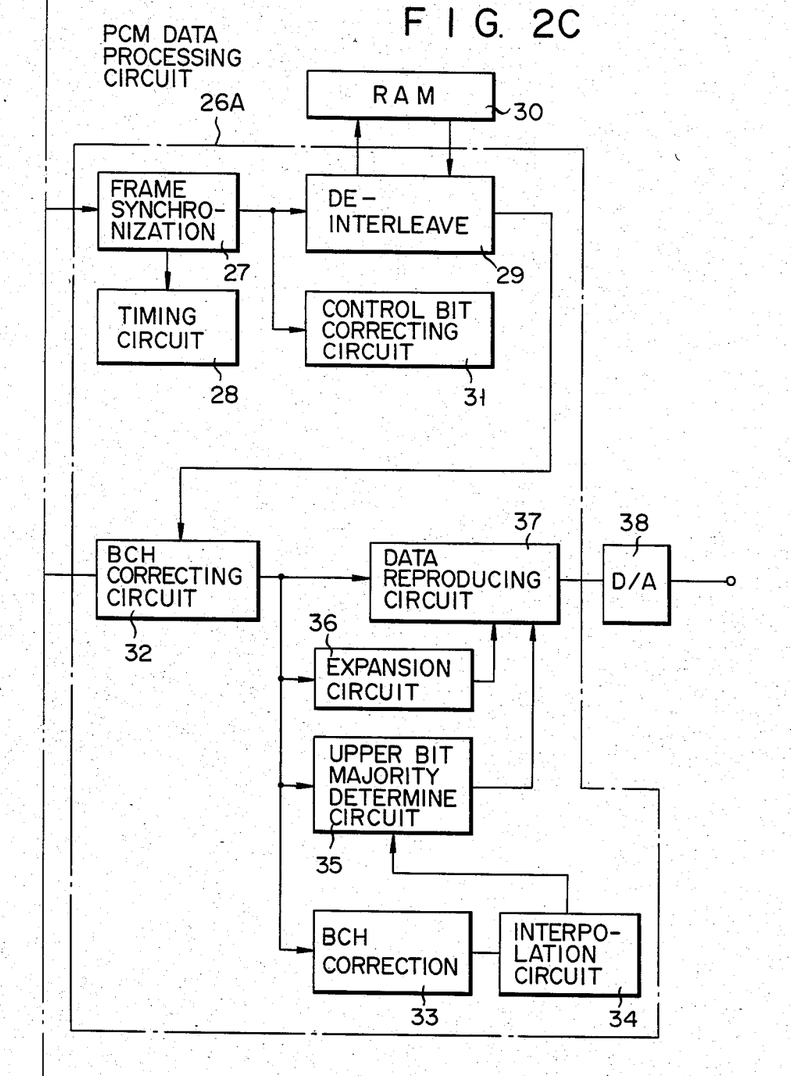

FIG. 2 shows a detailed circuit arrangement of the carrier reproducing circuit of FIG. 1. An RF signal input to an input terminal 10 is frequency converted into a baseband signal of 6.4 MHz, for example, by the combination of a first frequency converter 13 made up of a first mixer 11 and a first oscillator 12, and a second frequency converter 16 made up of a second mixer 14 and a second oscillator 15. During this frequency conversion, a frequency variation must be minimized to ensure an exact reproduction of the carrier by a carrier reproduction circuit 18. To this end, a frequency variation of the frequency $f_{RF}$ of the input RF signal and the frequency $f_{osc2}$ of the second oscillator 15 must be reduced to the minimum.

As seen from the equation (2), reduction of C/N ratio greatly influences the bit error occurence. Therefore, the frequency variation resulting from the frequency conversion must be reduced to the smallest possible degree. Otherwise, a correct baseband signal cannot be obtained.

In the embodiment of FIG. 2, the output signal from the second frequency converter 16 is feed back to the first oscillator 12 of the first frequency converter 13, through a PSK demodulator 17, so as to reduce a frequency variation of the RF input signal and the output signal of the second oscillator 15.

The first frequency converter 13 converts the frequency of the input RF signal into a frequency $f_{IF}$. The frequency $f_{IF}$ is a difference between the frequency $f_{osc1}$ of the output signal from the first oscillator 12 and the frequency $f_{RF}$ of the input RF signal, as given below $$f_{IF}=f_{osc1}-f_{RF}\ldots \quad (3)$$

The output frequency $f_{IF}$ of the first frequency converter 13 is converted, by the second frequency converter 16, into a frequency fo. The frequency fo is a difference between the oscillating frequency $f_{osc2}$ of the second oscillator 15 and the frequency $f_{IF}$, and given by the following equation (4)

$$fo=f_{osc2}-f_{IF}\ldots \quad (4)$$

The output signal from the second frequency converter 16 is coupled to the PSK demodulator 17. The carrier reproduction circuit 18 of the PSK demodulator 17 reproduces the carrier. To stabilize the frequency of a voltage controlled oscillator 19, the output signals from the VCO 19 and the carrier reproduction circuit 18 are applied to a first phase comparator 20. The result of the phase comparison is feed back to the VCO 19, through an adder 21. The VCO 19, the adder 21, and the phase comparator 20 form a so called phase locked loop (PLL) circuit.

The output signal from the VCO 19 is frequency divided by a factor of N by a one-to-N frequency divider 22. The divided frequency f/N is applied to one of the input terminals of a second phase comparator 23. The output frequency $f_{osc1}$ of the first oscillator 12 is divided into a factor of M by a one-to-M frequency divider 24. The divided frequency $f_{osc1}/M$ is input to the other input terminal of the second phase comparator 23. The phase comparison result from the second phase comparator 23 is applied through a low-pass filter 25 to the first oscillator 12, and phase controls the oscillating signal of the first oscillator 12.

Therefore, during the process of the frequency conversion, the following equation (5) holds $$f/N = f_{osc1}/M \ldots \qquad (5)$$

If the PLL circuit of the PSK demodulator 17 properly operates to make the input frequency fo equal to the output frequency f of the VCO 19, an equation (6) holds $$f_o = (f_{RF} + f_{osc2})/(1+K) \ldots \qquad (6)$$

where $K = M/N$.

The equation (6) indicates that a variation in both the frequencies $f_{RF}$, $f_{osc2}$ is reduced to $1/(1+K)$. Therefore, so long as the equation (6) holds, a frequency variation of the input signal can remarkably be reduced.

Thus, by stabilizing the output frequency fo of the second frequency converter 16, the bit error of the demodulated data can be reduced. The pull-in range of the VCO 19 per se is a center frequency range ±200 Hz to ±300 Hz. It can be widened to ±5 KHz by the circuit arrangement of FIG. 2 satisfying the equation (6).

In the PSK demodulator 17, the carrier reproduction circuit 18 reproduces an intended carrier depending on the result of the detection. In this case, if the pull-in range of the VCO 19 is narrow, the detection output level is improper in the critical region of the frequency pull-in range. Therefore, the phase of the reproduced carrier is also improper, leading to occurence of bit error. If the pull-in range is wide as in the present embodiment, such phase error problem of the reproduced carrier can be solved. This will be described in more detail below. The carrier reproduction circuit 18 discriminates a 6.4 MHz and 4-phased PSK modulated carrier associated with the incoming data by a detector (not shown), and phase controls the oscillating signal of the VCO 19 on the basis of the result of the carrier discrimination by the detector. In this case, if the pull-in range of the VCO 19 is narrow, the detection output as the phase control data is small, it cannot lock the phase of the oscillating signal of the VCO 19 to the proper phases of the 4-phase PSK modulated carrier. As a result, the reproduced carrier contains improperly shifted phases, and hence the decoded data would contain bit errors.

As seen from the foregoing description, the arrangement of FIG. 2 minimizes a frequency variation in the process of frequency conversion from the input RF signal frequency $f_{RF}$ to the input signal frequency fo for the PSK demodulator 17, and further widens the pull-in range of the VCO 19 of the PSK demodulator 17. Accordingly, this arrangement can accurately convert an input RF signal frequency into the intended baseband frequency.

To correctly demodulate the incoming data, the pull-in range frequency of the VCO 19 must be set to an appropriate one. To this end, a bit error rate of the demodulated data is detected. The detected bit error rate is applied as correction data to the control voltage for the VCO 19.

This will be described below in detail. In the circuit arrangement shown in FIG. 2, the correction data is calculated from a bit error rate of the demodulated data. The correction data is added to the output signal from a first phase comparator 20.

The baseband signal discrimination PLL arrangement as mentioned above produces the signal at the output of the PSK demodulator 17. The signal then enters a data processing circuit 26. In the data processing circuit 26, the thus obtained signal is subjected to various digital processings such as the gray code conversion, the logical subtraction, and P/S conversion, and is output in the form of serial PCM data. The PCM data is input to a PCM data processing circuit 26A. In the PCM data processing circuit 26A, the PCM data is frame synchronized by a frame synchronizing circuit 27. A frame timing generator 28 generates timing signals for processing the PCM data.

The incoming data, which was interleaved for preventing burst noise in the transmitting side, is temporarily stored in a random access memory 30 before it is deinterleaved. The deinterleaved data is output as the sound data of the sound to be reproduced. A control bit correction circuit 31 checks whether the control bit contained in the frame is correct, and if it is erroneous, corrects it.

As for the error check for the demodulated data, the data output from the deinterleave circuit 29 is input to a BCH correction circuit 32 for checking a double error of the BCH code, and for correcting the data. The range data of the sound data in the corrected PCM data is corrected by a BCH code correction circuit 33. Further, a range error interpolating circuit 34 makes the range error interpolation. The output data from the range error interpolating circuit 34 is transferred to an upper order bit majority determine protecting circuit 35. For the error occurring in the upper order bits of the data on the transmission line, the circuit 35 makes a decision by majority on the upper bits in the frame, and uses the result of the majority determine for the upper order bits data. A expandor 36 expands the compressed data to return it to the original data. The correction data for the error, inclusive of the expanded data, is transferred to a reproducing data generator 37, and to a D/A converter 38. The D/A converter 38 D/A converts the data to provide a desired analog sound signal.

A quality of the demodulated sound signal thus obtained depends largely on a stability of the reproduced carrier by the carrier reproduction circuit 18. To realize the stability, the present invention stabilizes the pull-in frequency. To this end, correction data is formed referring to the number of the error detections made by the BCH correction circuit 32 in the PCM data processing circuit 26A. The correction data is added to the control voltage to the VCO 19. Thus, the pull-in frequency is stabilized by using the error detection of the reproduced PCM data. With the stabilized pull-in frequency, the carrier is exactly reproduced, to provide the reproduced data of a reduced bit error rate.

Control of the VCO 19 is made on the basis of the reproduced data. The control data for this control is derived from the error detection by the BCH correction circuit 32. The correction data generator 39 generates the correction data using the error detection, exactly the number of error detections. The correction data is added to the output data from the first phase comparator 20, by a voltage superposing means, i.e., the adder 21. The addition result is applied to the VCO 19, to stabilize the frequency of the reproduced carrier.

In the correction data generator 39, a counter 40 counts the number of error detections in the BCH correction circuit 32. The counted value is transferred to a pulse width modulator 41. The pulse width modulator 41 makes the pulse width modulation according to the counted value, and feeds its output to the adder 21 via a filter 42.

The voltage of the correction data applied from the correction data generator 39 to the adder 21 is set up in the following way. Upon shifting the oscillating frequency of the VCO 19 from the pull-in frequency, the lower limit frequency of the pull-in range is obtained by increasingly sweeping the frequency from a frequency lower than the lower limit frequency. The upper limit frequency of the pull-in range is obtained by decreasingly sweeping the frequency from a frequency higher than the upper limit frequency. A proper pull-in frequency is calculated using the upper and the lower limit frequencies thus obtained. The voltage corresponding to the proper pull-in frequency and the pulse width as given by the pulse width modulator 41, is the voltage of the correction data. This will be described in detail referring to FIG. 3.

Figure 3:
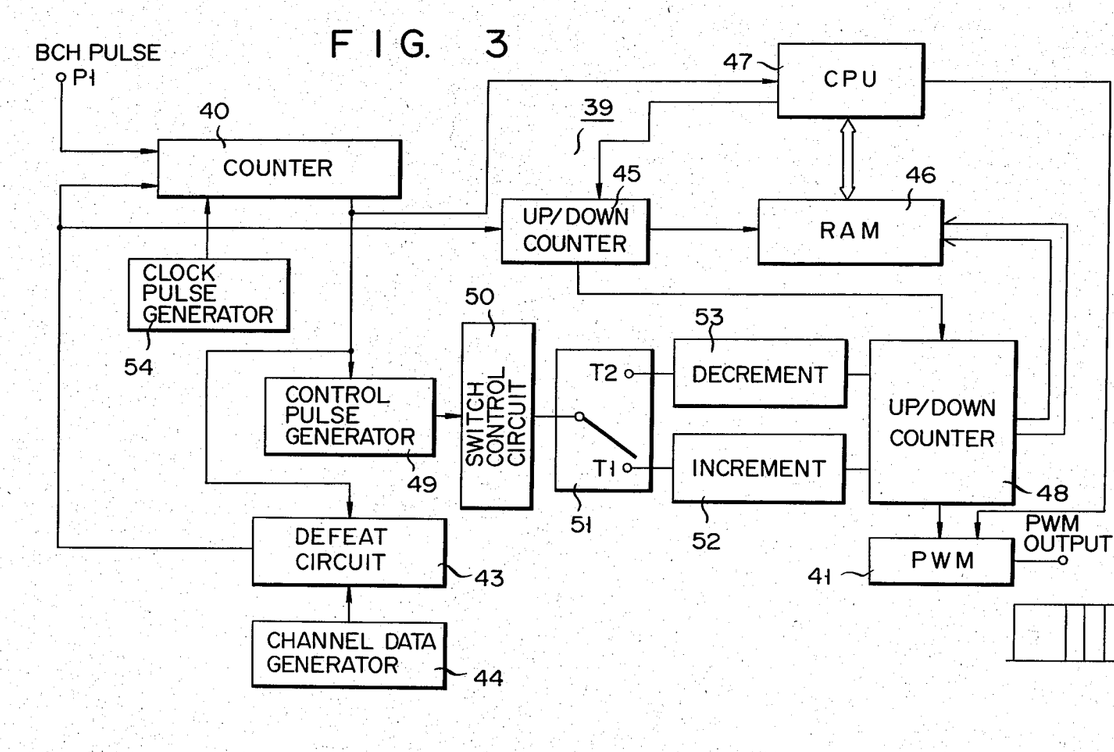
FIG. 3 is a block diagram of a frequency correction data generator used in the circuit of FIG. 1.

At the time of detecting the critical frequencies of the pull-in range, if the oscillating frequency of the VCO 19 is within the pull-in range, the frequency shift from the pull-in range will not occur, so that improper detection of the upper and the lower frequencies is infrequent. To avoid this, a defeat circuit 43 is provided. At the time of channel selection by a channel data generator 44 and turning on the power source, the defeat circuit 43 forcibly pulls out the oscillating frequency of the VCO 19 from the pull-in range.

Commercially available IC packages for QPSK demodulation is TA7751P (type number) manufactured by TOSHIBA Co., Ltd. in Japan. The IC package contains the AGC circuit, the phase synchronous detector for QPSK modulation, the clock reproduction PLL circuit, etc., and performs various digital processings such as the logical sum operation, P/S conversion, etc.

Turning now to FIG. 3, there is illustrated in detail the correction data generator 39. Upon channel selection by the channel data generator 44, the defeat circuit 43 produces a defeat pulse. The defeat pulse resets the counter 40 for counting the BCH pulses. After the reset, a countable range of the counter 40 between the upper and the lower frequencies of the pull-in range of the VCO 19 are set up by an up/down counter 45. When the bit error of the decoded data is small, if the VCO 19 is controlled, the PLL circuit is instable in operation. The control of the VCO 19 under large bit error condition provides an excessive control voltage. With such an excessive control voltage, the PLL system is instable, so that the frequency of the VCO 19 is pulled into a frequency for another channel different from that to be selected. The countable range of the counter 40 prevents such a problem.

When a defeat pulse is generated by the defeat circuit 43 at the time of channel selection, a CPU 47 reads out a predetermined value N1 from a RAM 46, and presets it in the CPU 47. Under this condition, the next data packet comes in, and the counter 40 counts output pulses of a clock pulse generator 54 during a time period corresponding to the BHC pulse duration. The counted value of the counter 40 is supplied, by the CPU 47, to the up/down counter 45. The up/down counter 45 performs the up/down count, causing the pulse width modulator 41 to produce a pulse signal with the pulse width at the output. With increment of the counted value of the up/down counter 45, a voltage formed by smoothing the output pulses of the pulse width modulator 41 increases, resulting in increase of the correction data voltage. At the initial stage of the VCO control, the oscillating frequency of the VCO 19 is forcibly set to a frequency below the lower limit frequency of the pull-in range, and then the frequency is increased into the pull-in range. At this time, the counted value (N1 + $N_L$) of the up/down counter 45 is made to correspond to the lower limit frequency.

For the next data packet, the counter 40 is reset, the oscillator frequency of the VCO 19 is forcibly set at a frequency higher than the upper limit frequency. The CPU 47 reads out a value N2 from the RAM 46, and presets it in the up/down counter 45. Then, the up/down counter 45 is set to a down count mode, and starts the down count according to the counted value on the bit error data as is given by the counter 40. With the down count, the voltage resulting from smoothing the output pulse of the pulse width modulator 41 drops, and the frequency of the VCO 19 also decreases to reach the upper limit frequency of the pull-in range. At this time, the counted value of the up/down counter 45 is (N2−N4). This counted value is written into the RAM 46.

In this way, the counted values (N2−N4) and (N1+$N_L$), at the initial stage of the VCO control, are written into the RAM 46, and are preset in the up/down counter 48. In this case, the counted values define the countable range of the up/down counter 48. The CPU 47 reads out the upper and the lower limit values from the RAM 46, averages them, and sets them in the up/down counter 45. For the next data packet, the up/down counter 45 is controlled according to the counted value of the counter 40 which represents the number of bit error detections. The pulse width modulator 41 produces a pulse signal with the pulse width corresponding to the BCH pulse.

The operation will now be explained. The counter 40 counts BCH pulses generated responsive to the bit error of the decoded data, and inputs the counted value to the control pulse generator 49. The control pulse generator 49, which stores the counted values of the counter 40 for each data packet, produces pulses corresponding to a difference between the present counted value and the previous one. When the counted value for the present packet data is smaller than that for the previous data packet, the control pulse generator 49 produces negative going pulses corresponding to the difference between them. The output pulses are applied to a switch control circuit 50. The switch control circuit 50 controls a switch 51 dependent on the polarity of the pulses, negative or positive.

For the positive going pulses, the switch 51 forms a path connecting to an increment 52 via a contact T2. For the negative going pulses, a path connecting to a decrement 53 via a contact T1 is formed. The counted value of the up/down counter 48 is controlled according to the increased or decreased number of the BCH pulses. The pulse width modulated signal corresponding to the counted value appears at the output of the pulse width modulator 41. The output pulse from the pulse width modulator 41 is smoothed, and applied to the adder 21. The adder 21 adds together the pulse width signal and the control voltage for the VCO 19.

The up/down counter 48 up or down counts according to the number of BCH pulses within the countable range between the upper and the lower limit as are set at the initial stage of the control. Through the counting operation, the frequency of the VCO 19 is controlled to an optimum frequency to minimize the bit error of the decoded data.

Thus, when the control voltage for the VCO 19 is corrected, the PLL system is stabilized by presetting the upper and the lower limits for the countable range in the up/down counter 48.

When the number of the BCH pulses is abnormally large, it is difficult to control the frequency of the VCO 19. To avoid this, when the number of the BCH pulses reaches a predetermined number, the defeat circuit 43 operates to reset the counter 40 and to stop the outputting of the correction data.

What is claimed is:

1. A carrier reproducing circuit for signals transmitted in carrier suppressed modulation comprising:
   frequency converting means for converting said transmission signal to a frequency of a carrier to be reproduced;
   demodulator means, coupled to said frequency converting means, for demodulating transmission data, said demodulator means including carrier reproducing means for producing said carrier, voltage controlled oscillator means, coupled to said carrier reproducing means, for generating an oscillation output and for supplying said oscillation output to said carrier reproducing means, and phase comparing means, coupled to said carrier reproducing means and said voltage controlled oscillator means, for comparing the phase of said reproduced carrier and said oscillation output and for generating a control voltage, said voltage controlled oscillator means being controlled by said control voltage;
   error detecting means coupled to said demodulator means for detecting the bit error rate of said demodulated data; and
   frequency correction data generator means coupled to said error detecting means for generating a correction voltage in accordance with said detected bit error rate, said frequency correction data generator being coupled to said voltage controlled oscillator means so as to superimpose said correction voltage onto said control voltage.

2. A carrier reproducing circuit according to claim 1, wherein said transmission signal includes a 4-phase shift keying signal.

3. A carrier reproducing circuit according to claim 1, wherein the output of said voltage controlled oscillator means couples to said frequency converting means.

4. A carrier reproducing circuit according to claim 1, wherein said error detecting means includes a Bose-Chaudhuri-Hocquengham (BCH) code correction circuit.

5. A carrier reproducing circuit according to claim 4, wherein said frequency correction data generator means includes counter means for counting the number of error detections generated by said BCH code correction circuit, said counter generating a count output, and pulse width modulator means for generating said correction voltage in accordance with said counter output.

* * * * *